US012402236B2

(12) United States Patent
Latrasse et al.

(10) Patent No.: US 12,402,236 B2
(45) Date of Patent: Aug. 26, 2025

(54) DEVICE FOR PRODUCING A PLASMA COMPRISING A PLASMA IGNITION UNIT

(71) Applicant: SAIREM SOCIETE POUR L'APPLICATION INDUSTRIELLE DE LA RECHERCHE EN ELECTRONIQUE ET MICRO ONDES, Decines Charpieu (FR)

(72) Inventors: Louis Latrasse, Charbonnieres-les-Bains (FR); Fadi Zoubian, Bron (FR); Nicolas Renaut, Saint-Priest (FR)

(73) Assignee: SAIREM SOCIETE POUR L'APPLICATION INDUSTRIELLE DE LA RECHERCHE EN ELECTRONIQUE ET MICRO ONDES, Decines Charpieu (FR)

( * ) Notice: Subject to any disclaimer, the term of this patent is extended or adjusted under 35 U.S.C. 154(b) by 207 days.

(21) Appl. No.: 18/275,685

(22) PCT Filed: Feb. 3, 2022

(86) PCT No.: PCT/FR2022/050205
§ 371 (c)(1),
(2) Date: Aug. 3, 2023

(87) PCT Pub. No.: WO2022/167758
PCT Pub. Date: Aug. 11, 2022

(65) Prior Publication Data

US 2024/0130031 A1 Apr. 18, 2024

(30) Foreign Application Priority Data

Feb. 3, 2021 (FR) ..................................... 21/01027

(51) Int. Cl.
*H05H 1/24* (2006.01)
*H05H 1/46* (2006.01)

(52) U.S. Cl.
CPC ................................ *H05H 1/4622* (2021.05)

(58) Field of Classification Search
CPC ............................ H05H 1/4622; H05H 1/463
See application file for complete search history.

(56) References Cited

U.S. PATENT DOCUMENTS 4,780,881 A 10/1988 Zhang et al.
6,593,507 B2 * 7/2003 Ikeda .................... H05B 6/701 588/317

(Continued)

FOREIGN PATENT DOCUMENTS

CN 201230400 Y 4/2009
CN 106322433 A 1/2017

(Continued)

OTHER PUBLICATIONS

International Search Report dated May 11, 2022; International Application No. PCT/FR2022/050205; 3 pages (English).

(Continued)

*Primary Examiner* — Minh D A
(74) *Attorney, Agent, or Firm* — CANTOR COLBURN LLP

(57) ABSTRACT

A device for producing a plasma, configured to generate a plasma from a reaction gas, wherein the device for producing a plasma comprises a microwave generator operating at a given source frequency comprised within a microwave frequency range and a waveguide coupled to the microwave generator and configured to guide an excitation wave. The device also includes a dielectric tube extending longitudinally along an axis of extension, the dielectric tube being configured to receive the plasma, such as the dielectric tube (Continued)

passes right through the waveguide; and a reaction gas injection unit configured to introduce the reaction gas into the dielectric tube.

20 Claims, 3 Drawing Sheets

(56) References Cited

U.S. PATENT DOCUMENTS

| | | | | |
|---|---|---|---|---|
| 2008/0011232 | A1* | 1/2008 | Rius | H01J 37/3222 118/733 |
| 2011/0234102 | A1 | 9/2011 | Kim et al. | |
| 2015/0366043 | A1* | 12/2015 | Lee | H05H 1/46 315/111.21 |
| 2023/0035483 | A1 | 2/2023 | Li | |

FOREIGN PATENT DOCUMENTS

| | | | |
|---|---|---|---|
| EP | 2781141 | A1 | 9/2014 |
| JP | 2004221019 | A | 8/2004 |

OTHER PUBLICATIONS

International Search Report dated May 11, 2022; International Application No. PCT/FR2022/050205; 5 pages (non-English).
Written Opinion dated May 11, 2022; International Application No. PCT/FR2022/050205; 8 pages (non-English).

* cited by examiner

DEVICE FOR PRODUCING A PLASMA COMPRISING A PLASMA IGNITION UNIT

CROSS REFERENCE TO RELATED APPLICATIONS

This application is a National Stage of PCT Application No. PCT/FR2022/050205 filed on Feb. 3, 2022, which claims priority to French Patent Application No. 21/01027 filed on Feb. 3, 2021, the contents each of which are incorporated herein by reference thereto.

TECHNICAL FIELD

The present disclosure relates to the field of devices for producing a plasma comprising an ignition unit and more specifically to a device for producing a plasma at atmospheric pressure. The ignition unit is capable of igniting the plasma electromagnetically and therefore not electrically.

BACKGROUND

In a known manner, document US 2011/0234102 describes an apparatus for ignition of a plasma at atmospheric pressure and a method for igniting a plasma at atmospheric pressure using said apparatus. More specifically, US 2011/0234102 concerns an apparatus for igniting an atmospheric-pressure plasma which can perform the ignition in a non-electrical manner, thereby solving many problems caused by high voltage (e.g. excessive power supply and safety issue), preventing the ignition apparatus from being physically damaged due to plasma heat, and allowing the use of new types of metallic materials. In other words, document US 2011/01234102 proposes the generation of a plasma in a dielectric tube, the reaction gas being introduced into said dielectric tube through a waveguide and a microwave being applied to the waveguide, wherein the ignition apparatus comprises an ignition rod configured to be placed through the dielectric tube, the ignition rod emitting thermo electrons when the microwaves are applied thereto in the dielectric tube. The ignition apparatus comprises moving means for moving the ignition rod into or out of the dielectric tube through the dielectric tube.

However, these solutions do not give complete satisfaction.

Indeed, the solution proposed in document US 2011/0234102 implies that the ignition rod, once in the microwave electric field, makes it possible to conduct these microwaves towards the pneumatic actuator, the ignition rod being a metallic conductor. Such an arrangement leads to the degradation of said ignition rod, and in particular of the seals allowing its operation.

The proposed solution, although allowing the ignition of a plasma, does not allow this to be done with relatively low microwave powers, and it is very often necessary to greatly increase the power of said microwaves to allow ignition, which contributes all the more to the degradation of the ignition elements such as the ignition rod, which will spray more quickly during the time it is directly exposed to the plasma, and the seals which will also degrade more quickly.

The state of the art can also be illustrated by the teachings of document CN106322433 which proposes a device for producing a plasma, using an ignition electrode carried by a dielectric support, but whose shapes and dimensions are unsuitable for cutting off the waves effectively.

The state of the art can also be illustrated by the document CN201230400 which proposes a device for producing a plasma, using an ignition electrode which can be lowered and raised, where this ignition electrode enters directly into the dielectric tube where the plasma is produced, such that the waves are not cut and go up to the opening of the tube through which the ignition electrode passes, at the risk of damaging any seals provided on this tube opening.

The present disclosure aims to solve all or part of the drawbacks mentioned above.

BRIEF SUMMARY

To this end, the present disclosure concerns a device for producing a plasma, configured to generate a plasma from a reaction gas, wherein the device for producing a plasma comprises:

- a microwave generator operating at a given source frequency within a microwave frequency range;
- a waveguide coupled to the microwave generator and configured to guide an excitation wave;
- a dielectric tube extending longitudinally along an axis of extension, the dielectric tube being configured to contain the plasma, such that the dielectric tube passes right through the waveguide;
- a duct, configured to envelop the dielectric tube, so as to hold said dielectric tube in position; and
- a reaction gas injection unit configured to introduce the reaction gas into the dielectric tube;
- the device for producing a plasma further comprises a plasma ignition unit comprising:
- an ignition electrode extending longitudinally along the axis of extension comprising a proximal body portion and a distal body portion, wherein the distal body portion comprises a securing member;
- a securing unit made of dielectric material configured to receive the securing member of the ignition electrode; and
- a moving unit configured to receive the securing unit and to move both said securing unit and the ignition electrode together from a first position in which the ignition electrode is outside the waveguide to a second position in which at least one part of the proximal body portion of the ignition electrode is disposed in the dielectric tube and in the waveguide;
- wherein the ignition electrode is configured to generate an electric field from the excitation wave and allow ignition of the plasma when said ignition electrode is in the second position; and
- wherein the ignition electrode has an overall length along the axis of extension substantially equal to half of a source wavelength corresponding to the celerity divided by the source frequency.

Thus, according to the present disclosure, the overall length of the ignition electrode is substantially equal to half of the source wavelength (or wavelength of the source wave in vacuum); it should be noted that, within the meaning of the present disclosure, substantially equal means perfectly equal or equal to within 15%. In other words, the overall length of the ignition electrode is comprised between 35% and 65% of the source wavelength, and preferably comprised between 35% and 50% of the source wavelength.

Such a conformation of the overall length is particularly advantageous for enabling the resonance between its two ends, and thus making it possible to obtain an electric field having sufficient intensity to allow the breakdown of the gas while limiting the intensity of the excitation wave, which makes it possible both to be energy efficient and to preserve the plasma producing device.

Indeed, the ignition electrode and the duct (which is electrically conductive and for example made of metal) surrounding the dielectric tube form a coaxial guide, and the wavelength of the excitation wave guided in this coaxial guide is substantially equal to the source wavelength, in other words the wavelength of the excitation wave (or source wave) in vacuum. Thus, with this conformation, the overall length of the ignition electrode will substantially correspond to the resonance length, as described in more detail hereinbelow.

As an example, if the ignition electrode is fully inserted into the securing unit and the latter has a permittivity equal to 1, i.e. a permittivity equal to the permittivity of vacuum or of air, then the resonance length of the ignition electrode is equal to the half-wavelength of the excitation wave in the waveguide, i.e. the half-length in vacuum if the waveguide forms a coaxial guide. Indeed, the wavelength in a material is inversely proportional to the square root of the permittivity of said material. Thus, as an example, for a permittivity equal to 9 the wavelength is 3 times less. If the overall length of the ignition electrode is 41 mm including 10 mm in the securing unit such that said securing unit has a permittivity equal to 9, this represents an equivalent resonance length in vacuum of: 31+10×9ˆ½=61 mm i.e. exactly the half-wavelength in vacuum of a wave having a frequency of 2.45 GHz.

Furthermore, with the present disclosure, and more particularly with the securing unit made of dielectric material (configured to receive the ignition electrode), this securing unit makes it possible not to transmit the excitation wave and thus to cut-off microwaves, which makes it possible to protect the moving unit from said excitation wave. In other words, the securing unit is interposed between the ignition electrode and the moving unit and therefore prevents overheating and damage of said moving unit.

The present disclosure thus makes it possible to maximize the cutoff of the waves which "rise" in the dielectric tube in the direction of the moving unit, because the wave resonates in the dielectric tube, inside the duct, between the two ends of the ignition electrode, one of its ends being in the waveguide to ignite the plasma and the other of its ends being in the duct, further amplifying the electric field.

According to one embodiment, the overall length of the ignition electrode is comprised between 37% and 50% of the source wavelength (or source wavelength in vacuum), or even comprised between 37 and 45%.

Indeed, it is advantageous for the overall length of the ignition electrode to be slightly less than or equal to the source half-wavelength, i.e. between 37% and 50% of the source wavelength, because there is the dielectric securing unit above to hold it.

Thus, and as an example, if the source wave has a frequency of 2.45 GHz, then the ignition electrode has a length comprised between 45 and 61 mm.

If the ignition electrode encloses the securing unit, then the overall length of the ignition electrode is comprised between 37% and 50% of the wavelength of the source wave in vacuum. Thus, if the source wave has a frequency of 2.45 GHz, then the ignition electrode has a length comprised between 45 and 61 mm, depending on the shape of the ignition electrode as well as the material and the shape of the securing unit. Thus, if the securing unit is made of alumina, the length will be shorter (for example 47 mm) than if the securing unit is made of PTFE (for example 51 mm) in order to preserve the resonance. Indeed, the more the material of the securing unit has a high permittivity, and/or the more the securing unit has a large contact surface with the ignition electrode, and the greater the resonance length of the ignition electrode is reduced. The overall length of the ignition electrode (which therefore corresponds to its resonance length) is reduced near a dielectric material having a permittivity greater than that of vacuum.

According to one advantage, the plasma producing device is capable of operating at atmospheric pressure and at a higher pressure.

According to one embodiment, in the second position, the ignition electrode is inserted via an insertion end into the dielectric tube up to the waveguide.

Within the meaning of the present disclosure, the microwave frequency range comprises all the frequencies between 300 MHz and 30 GHz.

According to a preferred embodiment, the frequency of the excitation wave is substantially equal to one of the following frequencies: 896 MHz, 915 MHz and 2.45 GHz.

According to one embodiment, the ignition electrode will enter into resonance with the excitation wave and thus will create a high intensity electric field.

According to one embodiment, the electric field generated thanks to the ignition electrode in order to allow the ignition of the plasma is at least equal to the electric field of reaction gas breakdown.

According to one embodiment, the ignition electrode is made of tungsten.

According to one embodiment, the moving unit is a cylinder, such as a pneumatic cylinder for example.

According to one embodiment, the waveguide comprises two receiving orifices facing each other, the receiving orifices being intended to receive the dielectric tube passing right through said waveguide by the receiving orifices.

According to one embodiment, the waveguide comprises an input orifice configured to receive the excitation wave.

In an advantageous embodiment, the ignition electrode has a conformation such that the proximal body portion has a proximal transverse dimension lower than a distal transverse dimension of the distal body portion.

In other words, the proximal body portion of the ignition electrode has a cross-sectional area smaller than the cross-sectional area of the distal body portion of the ignition electrode.

Such an arrangement makes it possible to obtain a maximum electric field at the end of the proximal body portion opposite to the distal body portion. Indeed, the cross-sectional area of the distal body portion being greater than the cross-sectional area of the proximal body portion, this will create a "point effect" and thus locally concentrate the electric field. Such an arrangement facilitates the ignition of the plasma.

Such an arrangement also makes it possible to obtain an ignition electrode with better mechanical resistance.

According to a variant, the proximal body portion has a proximal length along the axis of extension and the distal body portion has a distal length along the axis of extension, and wherein the proximal length is greater than or equal to the distal length.

In other words, the ignition electrode has the given overall length such that the proximal body portion of the ignition electrode extends over the proximal length that is at least equal to the distal length of the distal body portion of the ignition electrode.

Advantageously, the distal length is greater than or equal to a quarter of the overall length of the ignition electrode, and the proximal length is greater than or equal to a half of the overall length of the ignition electrode.

This conformation is advantageous for favoring the cutoff of the microwaves, while allowing proper operation of the ignition electrode in its role of ignition of the plasma.

According to one embodiment, the proximal body portion of the ignition electrode extends over a proximal length equal to 3/5 of the overall length of the ignition electrode; and thus the distal length is 2/5 of the overall length of the ignition electrode.

Alternatively, the proximal transverse dimension is constant over at least 90% of the proximal length, and the distal transverse dimension is constant over at least 90% of the distal length.

It should be noted that this proximal transverse dimension can correspond to a diameter (called proximal diameter), and likewise the distal transverse dimension can correspond to a diameter (called distal diameter).

According to one embodiment, the moving unit is configured to move along an axis of movement substantially coinciding with the axis of extension. Within the meaning of the present disclosure, "substantially coinciding" means exactly coinciding or coinciding within 10% or within more or less 5 degrees.

According to one embodiment, the axis of extension passes through the center of the dielectric tube.

According to one embodiment, the moving unit is configured so that in the first position, the ignition electrode is outside the dielectric tube.

Such an arrangement makes it possible to protect the moving unit from said microwaves more effectively. Such an arrangement is particularly advantageous at low pressure, indeed, the plasma can completely fill the dielectric tube in some cases, and the microwaves then rise higher thanks to the plasma.

According to one embodiment, the securing unit has an oblong shape along the axis of extension.

According to one embodiment, the securing unit has a solid circular cross-section and has a given diameter.

According to one embodiment, the securing unit has a cylindrical shape along the axis of extension.

In a particular embodiment, the diameter of the securing unit is substantially equal to a distal diameter of the distal body portion of the ignition electrode; it being noted, as a reminder, that substantially equal means perfectly equal or equal to within 15%.

Thus, the securing unit prolongs this distal body portion continuously (or substantially continuously) in a geometric point of view, which is advantageous in the microwave cutoff function.

According to one embodiment, the securing unit has a length, along the axis of extension, substantially equal to or greater than 1.3 D and preferably substantially equal to or greater than 1.5 D, D being the outer diameter of the dielectric tube.

Within the meaning of the present disclosure, substantially equal means perfectly equal or equal within 15%, and for example equal to within 10%.

Such an arrangement makes it possible to obtain a securing unit of sufficient length to allow the dielectric tube to be a guide when the microwaves are cut off. This makes it possible to effectively protect the moving unit from said microwaves.

According to one embodiment, the securing unit is made of technical ceramics.

Such an arrangement makes it possible to obtain a securing unit which effectively cuts off the microwaves and thus effectively protects the moving unit from said microwaves.

According to a favored embodiment, the securing unit has a permittivity of less than 5.

According to a favored embodiment, the securing unit has a permittivity of less than 10.

According to one embodiment, the securing unit is in alumina.

According to one embodiment, the securing unit is made of loaded alumina.

According to one embodiment, the securing unit comprises PTFE.

According to one embodiment, the securing unit is made of PTFE or of loaded PTFE having a respective permittivity of approximately 2.1 and 3.

Such an arrangement makes it possible to obtain a securing unit having good mechanical resistance.

According to one embodiment, the proximal body portion extends from the distal body portion.

According to one embodiment, the securing unit is of a length substantially equal to half the source wavelength.

According to one embodiment, the proximal body portion of the ignition electrode comprises a tapered end.

Such an arrangement makes it possible to obtain a maximum field at the level of the proximal body portion of the ignition electrode.

According to one embodiment, the tapered end is opposed to the distal body portion.

According to one embodiment, at least one part of the proximal body portion of the ignition electrode is located substantially at the level of a central axis of the waveguide when the ignition electrode is in the second position.

Such an arrangement makes it possible to obtain an electric field having a high intensity.

According to one embodiment, the waveguide is coupled to a reflector plane configured to generate a standing wave from the excitation wave.

According to one embodiment, the dielectric tube is disposed between the reflector plane and the inlet orifice.

According to one embodiment, the reflector plane is movable and thus forms a short-circuit piston.

Such an arrangement makes it possible to adapt the impedance by artificially modifying the size of said waveguide and by reflecting at least a part of the excitation wave. This allows the excitation wave to penetrate the plasma.

Such an arrangement makes it possible to move the movable reflector plane in the waveguide and thus allow the short circuit of the excitation wave over a wide frequency range.

According to one embodiment, the reflector plane is located at a distance substantially equal to $$n\frac{\lambda e}{2}+k\frac{\lambda e}{2}$$

from at least one part of the ignition electrode when the ignition electrode is in the second position, λe being the wavelength of the excitation wave guided in the waveguide, n being a natural integer and k being a coefficient between 0.7 and 1.3.

Such an arrangement makes it possible to obtain an electric field having a high intensity and thus facilitate ignition, in other words this position is advantageous for maximizing the electric field on the end of the ignition electrode.

Indeed, without an ignition electrode, it would be necessary to maximize the electric field to ignite a plasma, and thus locate the plasma area at a distance substantially equal to $\lambda e/4+n\lambda e/2$ with respect to the reflector plane. However, the Applicant has established that, due to the presence of the ignition electrode in the plasma area, the coupling is different because the wave propagates in the waveguide and also in the coaxial guide formed by the duct and the ignition electrode. Thus, the ignition electrode must be located at $n\lambda e/2$ plus or minus 30% of $\lambda e/2$, in other words at $n\cdot\lambda e/2+<k\cdot\lambda e/2$, k introducing this variability of plus or minus 30%.

According to one embodiment, once the plasma has been ignited, it becomes conductive, the moving unit then moves the securing unit and the ignition electrode together into an intermediate position in which the ignition electrode is not in contact with the plasma. The reflector plane is also moved to maximize coupling.

The different aspects that are not inconsistent defined hereinabove can be combined.

BRIEF DESCRIPTION OF THE DRAWINGS

The present disclosure will be better understood with the aid of the detailed description which is given hereinbelow with regard to the appended drawings in which.

DETAILED DESCRIPTION

Figure 1:
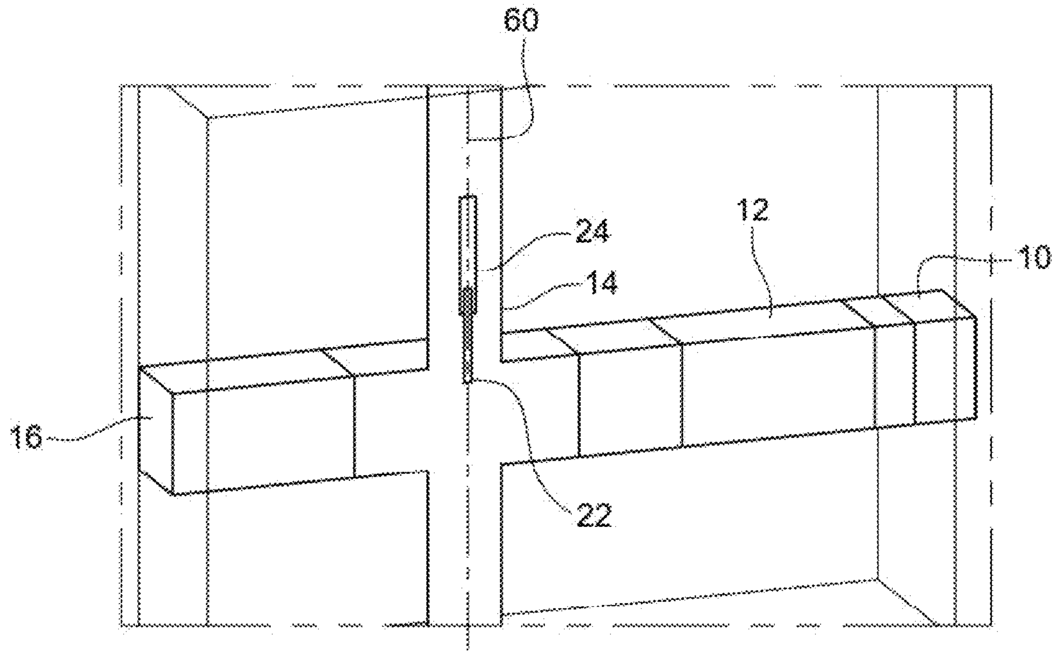
FIG. 1 represents a schematic view of a plasma producing device, in a position allowing the ignition of the plasma, in accordance with the present disclosure.

The figures illustrate a device for producing a plasma capable of operating at low pressure, atmospheric pressure or high pressure and configured to generate a plasma from a reaction gas. Within the meaning of the present disclosure, a low pressure is a pressure comprised between one tenth of the atmospheric pressure and the atmospheric pressure. Within the meaning of the present disclosure, a high pressure is a pressure comprised between the atmospheric pressure and five times the atmospheric pressure.

According to a preferred embodiment, the device for producing a plasma is used at atmospheric pressure.

The plasma producing device comprises a microwave generator 10 operating at a given source frequency comprised in a microwave frequency range. Within the meaning of the present disclosure, the microwave frequency range comprises all the frequencies between 300 MHz and 30 GHz. According to a preferred embodiment, the frequency of the excitation wave is substantially equal to one of the following frequencies: 896 MHz, 915 MHz and 2.45 GHz.

The plasma producing device comprises a waveguide 12 coupled to the microwave generator 10 and configured to guide an excitation wave. According to one embodiment, the waveguide 12 comprises two receiving orifices facing each other, the receiving orifices being intended to receive a dielectric tube 14 passing right through said waveguide 12 by the receiving orifices. According to one embodiment, the waveguide 12 comprises an input orifice configured to receive an excitation wave.

The device also comprises the dielectric tube 14 extending longitudinally along an axis of extension 60 passing through the center of the dielectric tube. The dielectric tube 14 is configured to receive the plasma, such that the dielectric tube 14 passes right through the waveguide 12.

The device comprises a reaction gas injection unit 31 configured to introduce the reaction gas into the dielectric tube 14.

The plasma producing device further comprises a plasma ignition unit comprising an ignition electrode 22 made of tungsten extending longitudinally along the axis of extension 60. The ignition electrode 22 comprises a proximal body portion 221 and a distal body portion 222, wherein the distal body portion 222 comprises a securing member 223. The ignition electrode 22 is configured to generate an electric field from the excitation wave and thus allows the ignition of the plasma. According to one embodiment, the proximal body portion 221 extends from the distal body portion 222.

According to one embodiment, the proximal body portion 221 of ignition electrode 22 has a cross-sectional area lower than the cross-sectional area of the distal body portion 222 of the ignition electrode 22. In other words, the proximal body portion 221 has a proximal transverse dimension, which corresponds to a proximal diameter D21, which is less than a distal transverse dimension D22 of the distal body portion 222, which corresponds to a distal diameter D22.

Such an arrangement makes it possible to obtain a maximum electric field at the end of the proximal body portion 221 opposite to the distal body portion 222. Indeed, the cross section of the proximal body portion 221 being smaller than the cross-section of the distal body portion 222, this will create a "point effect" and thus locally concentrate the electric field. Such an arrangement facilitates the ignition of the plasma. Such an arrangement also makes it possible to obtain an ignition electrode 22 with a better mechanical resistance.

According to one embodiment, the ignition electrode 22 has an overall length L2 along the axis of extension 60 which is substantially equal to half of a source wavelength corresponding to the celerity divided by the source frequency.

Within the meaning of the present disclosure, the overall length L2 of the ignition electrode 22 corresponds to the resonance length, as described in more detail hereinbelow.

As an example, if the ignition electrode 22 is fully inserted into a securing unit 24 having a permittivity of 1, i.e. equal to the permittivity of vacuum or of air, then the resonance length of the ignition electrode 22 is equal to the half-wavelength of the excitation wave in the waveguide 12, i.e. the half-length in vacuum if the waveguide 12 forms a coaxial guide. Indeed, the wavelength in a material is inversely proportional to the root of the permittivity of said material. Thus, as an example, fora permittivity equal to 9 the wavelength is 3 times less. If the overall length L2 of the ignition electrode 22 is equal to 41 mm including 10 mm in the securing unit such that said securing unit has a permittivity equal to 9, this represents an vacuum resonance equivalent length of: $31+10\times9^{\wedge}\frac{1}{2}=61$ mm i.e. exactly the half-wavelength in vacuum of a wave having a frequency of 2.45 GHz. Such an arrangement makes it possible to obtain an electric field having a sufficient intensity to allow the breakdown of the gas while limiting the intensity of the excitation wave, which makes it possible both to be energy efficient and to protect the plasma producing device.

According to an advantageous embodiment, the overall length L2 of the ignition electrode 22 is comprised between 37% and 50% of the wavelength of the source wave in vacuum. Thus, if the source wave has a frequency of 2.45 GHz, then the ignition electrode has a length comprised between 45 and 61 mm.

Figure 3:
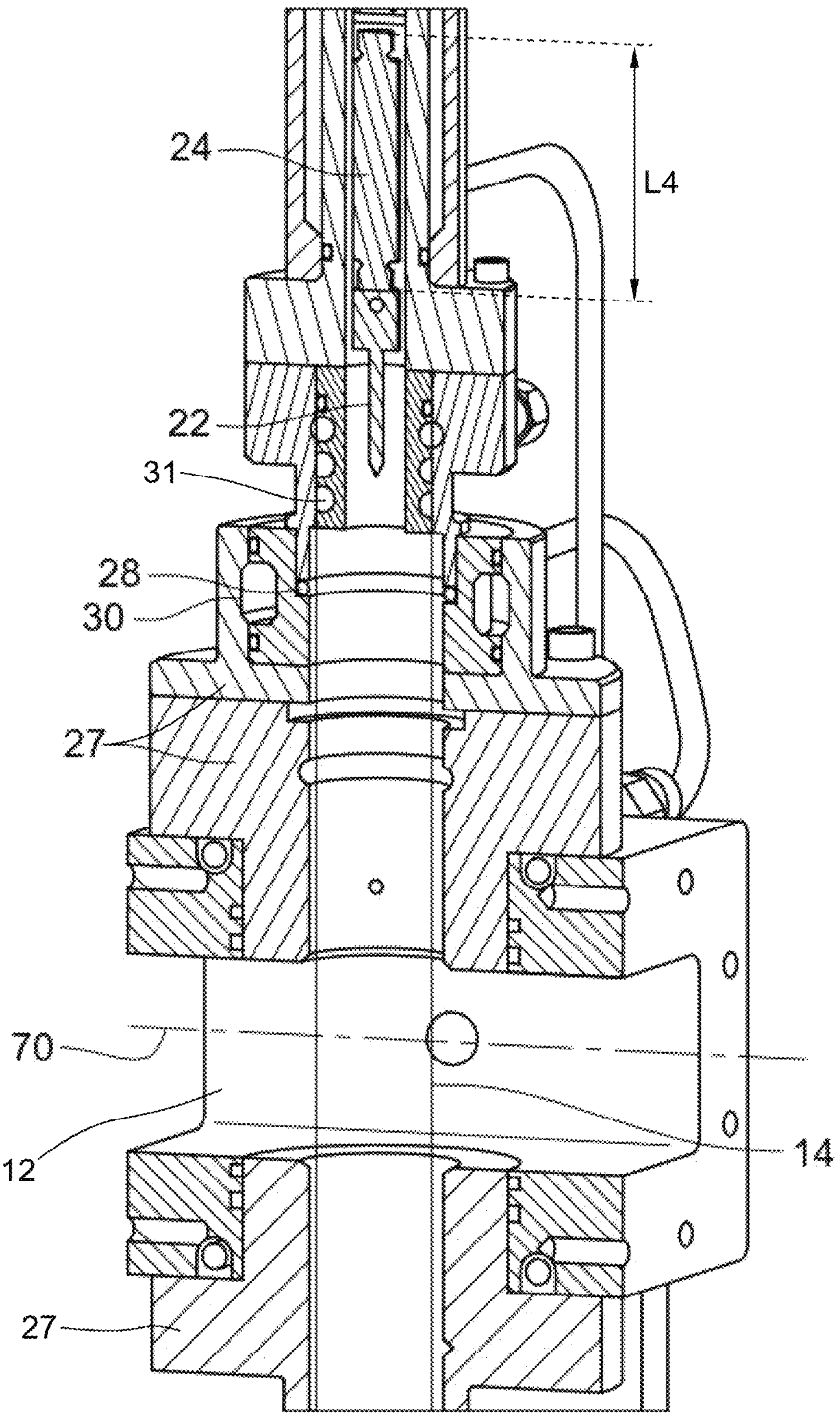
FIG. 3 represents a view of a plasma producing device in which an ignition device is in a first position.
Figure 4:
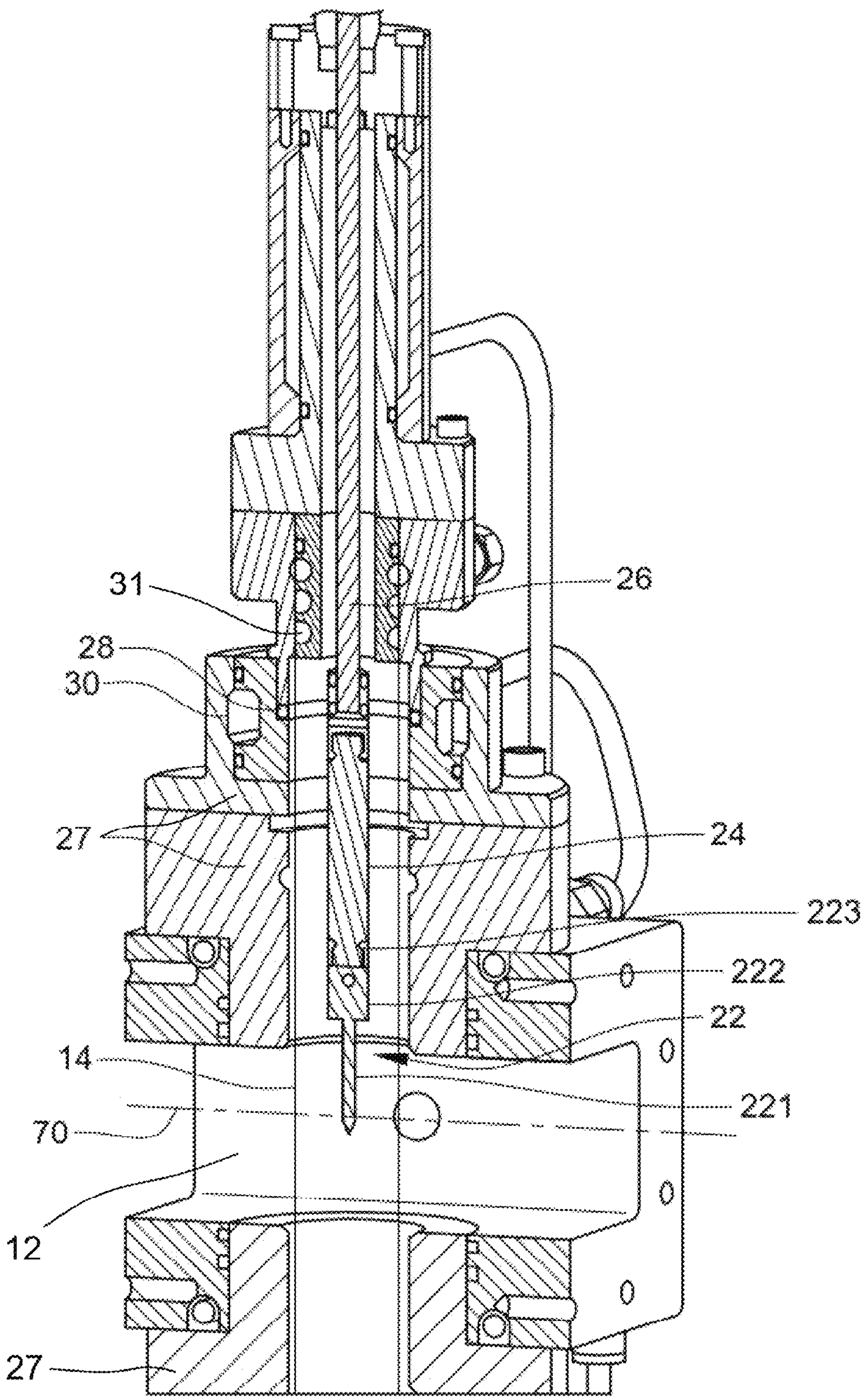
FIG. 4 represents a view of a plasma producing device in which an ignition device is in a second position.

If the ignition electrode encloses the securing unit, as represented in FIGS. 3 and 4, then the overall length L2 of the ignition electrode 22 is comprised between 37% and 50% of the wavelength of the source wave in vacuum. Thus, if the source wave has a frequency of 2.45 GHz, then the ignition electrode has a length comprised between 45 and 61 mm, depending on the shape of the ignition electrode as well as the material and the shape of the securing unit. Thus, if the securing unit 24 is made of alumina, the length will be shorter (for example 47 mm) than if the securing unit 24 is made of loaded PTFE (for example 49 mm) or of PTFE (for example 51 mm) to maintain the resonance. Indeed, the more the material of the securing unit 24 has a higher permittivity, and/or the more the securing unit has a larger contact surface area with the ignition electrode 22, and the more the resonance length of the ignition electrode 22 is reduced. The resonance length of the ignition electrode 22 is reduced near a dielectric material having a permittivity greater than that of vacuum.

The ignition electrode 22 has the overall length L2 given such that the proximal body portion 221 of the ignition electrode 22 extends over a proximal length L21 at least equal to a distal length L22 of the distal body portion 222 of the ignition electrode 22. In other words, the proximal body portion 221 has the proximal length L21 along the axis of extension 60 and the distal body portion 222 has the distal length L22 along the axis of extension 60, and this proximal length L21 is greater than or equal to the distal length L22.

More specifically, the proximal body portion 221 of the ignition electrode 22 extends over the proximal length L21 which is equal to ⅗ of the overall length L2 of the ignition electrode 22. More broadly, the distal length L22 is greater than or equal to a quarter of the overall length L2, and the proximal length L21 is greater than or equal to one half of the overall length L2.

According to one embodiment, the ignition electrode 22 and a duct 27 configured to envelop the dielectric tube 14 form a coaxial guide. The wavelength of the excitation wave guided in the coaxial guide is substantially equal to the wavelength of the excitation wave in vacuum.

The duct 27 is at least partially made of metal. Such an arrangement allows the duct 27 to play a shielding role that is to say to prevent microwave leaks.

According to one embodiment, the duct 27 comprises an annular retaining seal 28 at least partially surrounding the dielectric tube 14. The annular retaining seal 28 being configured to maintain the dielectric tube 14 in position and also to provide a seal between atmosphere and that inside the tube.

According to one embodiment, the annular retaining seal 28 is transparent to microwaves. Such an arrangement makes it possible to obtain an annular retaining seal 28 having less degradation over time.

According to one embodiment, the duct 27 comprises an annular cooling groove 30 configured to receive a cooling fluid. According to one embodiment, the annular cooling groove 30 is configured to provide cooling of the retaining seal 28.

According to an advantageous embodiment, the proximal body portion 221 of the ignition electrode 22 comprises a tapered end opposite the distal body portion 222. Such an arrangement makes it possible to obtain a maximum field at the level of the proximal body portion 221 of the ignition electrode.

As illustrated in FIG. 3, at least one part of the proximal body portion 221 of the ignition electrode 22 is located substantially at the level of a central axis 70 of the waveguide 12 when the ignition electrode 22 is in the second position. Such an arrangement makes it possible to obtain an electric field having a high intensity.

The ignition unit comprises a securing unit 24 made of dielectric material configured to receive the securing member 223 of the ignition electrode 22. This securing unit 24 made of dielectric material is thus configured to receive the ignition electrode 22 and it makes it possible not to transmit the excitation wave and thus to cut-off the microwaves, which makes it possible to protect a moving unit 26, described hereinbelow, from said excitation wave. In other words, the securing unit 24 is interposed between the ignition electrode 22 and the moving unit 26 and therefore prevents overheating and damage to said moving unit 26.

The securing unit 24 has a length L4, along the axis of extension 60, substantially equal to or greater than 1.3 D and preferably substantially equal to or greater than 1.5 D, D being the outer diameter of the dielectric tube 14. Within the meaning of the present disclosure, substantially equal means perfectly equal or equal to within 15%, or even within 10%. Such an arrangement makes it possible to obtain a securing unit 24 of a sufficient length to allow the metal duct 27 to be a guide when the microwaves are cut off. This makes it possible to more effectively protect the moving unit 26 from said microwaves.

According to one embodiment, the securing unit 24 is made of technical ceramics having a permittivity of less than 10 such as alumina or preferably less than 5, which makes it possible to obtain a securing unit 24 which cuts off the microwaves more effectively, and thus effectively protecting the moving unit 26 from said microwaves. Indeed, the lower the permittivity, the more effectively the securing unit 24 cuts off the microwaves.

According to an advantageous embodiment, the securing unit 24 is made of PTFE or loaded PTFE having a respective permittivity of approximately 2.1 and 3. Such an arrangement makes it possible to obtain a securing unit 24 having good thermal resistance.

Figure 2:
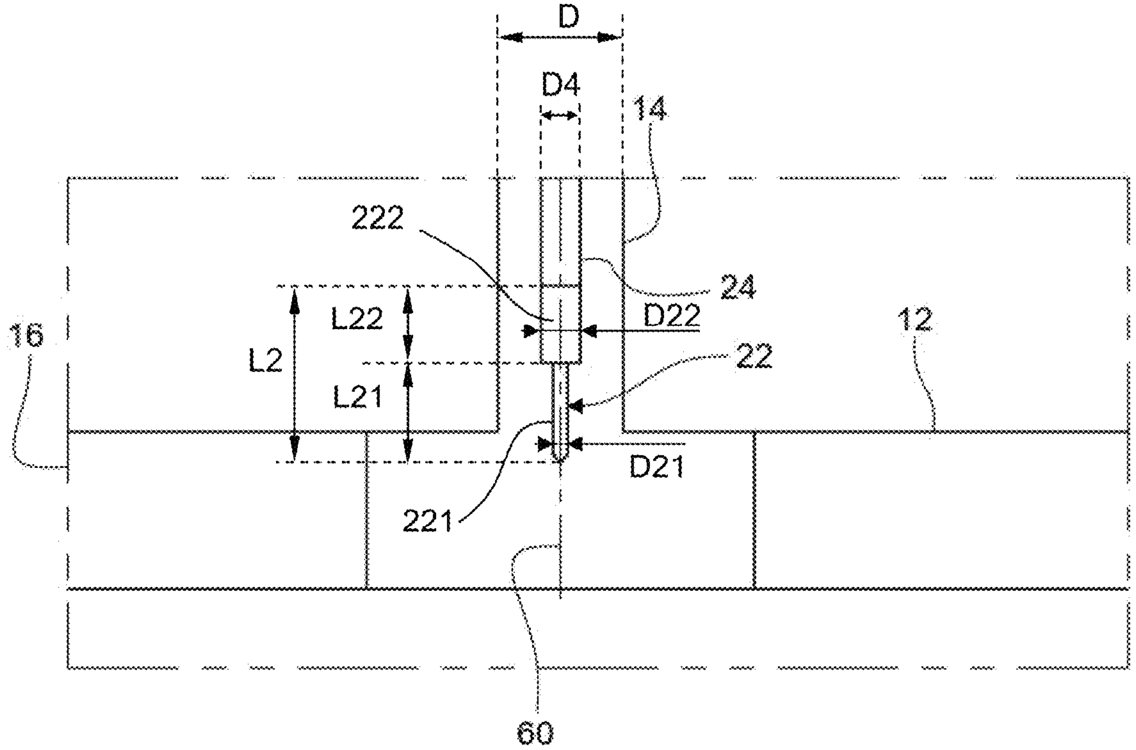
FIG. 2 represents a view of a plasma producing device in a position allowing the ignition of the plasma, in accordance with the present disclosure.

The moving unit 26 is configured to receive the securing unit 24 and move both said securing unit 24 and the ignition electrode 22 together from a first position represented in FIG. 2 in which the ignition electrode 22 is outside the waveguide 12 at a second position represented in FIG. 3 in which at least one of the proximal body portion 221 of the ignition electrode 22 is disposed within the dielectric tube 14 and in the waveguide 12. In this manner, when said ignition electrode 22 is in the second position, the ignition of the plasma is facilitated.

Once the plasma has been ignited, it becomes conductive, the moving unit 26 then moves the securing unit 24 and the ignition electrode 22 together into an intermediate position in which the ignition electrode is not in contact with the plasma. The reflector plane is also moved to maximize coupling.

According to one embodiment, the moving unit 26 is configured so that in the first position, the ignition electrode 22 is outside the dielectric tube 14. Such an arrangement makes it possible to protect the moving unit 26 from said microwaves more effectively.

According to one embodiment, in the second position, the ignition electrode 22 is inserted via an insertion end in the dielectric tube 14 up to the waveguide 22. Such an arrangement allows the ignition electrode 22 to enter into resonance with the excitation wave and thus create a high intensity electric field. According to one embodiment, the electric field generated by the ignition electrode in order to allow the ignition of the plasma is at least equal to the breakdown electric field of the reaction gas. According to one embodiment, the moving unit 26 is a cylinder, such as a pneumatic cylinder for example.

According to one embodiment, the moving unit 26 is configured to move along a moving axis substantially coincident with the axis of extension 60. Within the meaning of the present disclosure, substantially coincident means exactly coincident or coincident at with 10%.

According to one embodiment, the securing unit 24 has an oblong shape along the axis of extension 60 and has a solid circular cross-section, having a diameter D4 which is substantially equal to the distal diameter D22 of the distal body portion 222 of the ignition electrode 22.

The waveguide 12 is coupled to a movable reflector plane 16 configured to generate a standing wave from the excitation wave, thus forming a short-circuit piston. The dielectric tube 14 is arranged between the reflector plane 16 and the inlet orifice. Such an arrangement makes it possible to artificially modify the size of the waveguide 12 and to maximize the electric field at the position of the ignition electrode 22 in order to facilitate the ignition of the plasma by reflecting at least a part of the excitation wave. Once the plasma has been ignited, the position of the reflector plane 16 is modified in order to adapt the impedance. Such an arrangement makes it possible to maximize the power deposited in the plasma.

Before the ignition of the plasma, the reflector plane 16 is located at a distance substantially equal to $n \cdot \lambda e/2 + k \cdot \lambda e/2$ from at least one part of the ignition electrode 22 when the ignition electrode 22 is in the second position, λe being the wavelength of the excitation wave guided in the waveguide 14, n being a natural integer and k being a coefficient comprised between 0.7 and 1.3, or even comprised between 0.8 and 1.2. Such an arrangement makes it possible to maximize the electric field on the end of the proximal body portion 221 of the ignition electrode 22 and thus facilitate the ignition.

The invention claimed is:

1. A device for producing a plasma, configured to generate a plasma from a reaction gas, wherein the device for producing a plasma comprises:

a microwave generator operating a source wave at a given source frequency comprised within a microwave frequency range;

a waveguide coupled to the microwave generator and configured to guide an excitation wave;

a dielectric tube extending longitudinally along an axis of extension, the dielectric tube being configured to receive the plasma, such that the dielectric tube passes right through the waveguide;

a duct, configured to envelop the dielectric tube so as to hold said dielectric tube in position; and a reaction gas injection unit configured to introduce the reaction gas into the dielectric tube;

the device for producing a plasma further comprises a plasma ignition unit comprising:

an ignition electrode extending longitudinally along the axis of extension and comprising a proximal body portion and a distal body portion, wherein the distal body portion comprises a securing member;

a securing unit made of dielectric material configured to receive the securing member of the ignition electrode; and a moving unit configured to receive the securing unit and to move both said securing unit and the ignition electrode together from a first position in which the ignition electrode is outside the waveguide to a second position in which at least one part of the proximal body portion of the ignition electrode is disposed in the dielectric tube and in the waveguide;

wherein the ignition electrode is configured to generate an electric field from the excitation wave and allow ignition of the plasma when said ignition electrode is in the second position; and wherein the ignition electrode has an overall length along the axis of extension which is comprised between 35% and 65% of a source wavelength corresponding to a celerity of the source wave divided by the source frequency.

2. The device for producing a plasma according to claim 1, wherein the overall length of the ignition electrode is comprised between 37% and 50% of the source wavelength.

3. The device for producing a plasma according to claim 2, wherein the ignition electrode has a conformation such as the proximal body portion has a proximal transverse dimension lower than a distal transverse dimension of the distal body portion.

4. The device for producing a plasma according to claim 3, wherein the proximal body portion has a proximal length along the axis of extension and the distal body portion has a distal length along the axis of extension, and wherein the proximal length is greater than or equal to the distal length.

5. The device for producing a plasma according to claim 4, wherein the distal length is greater than or equal to a quarter of the overall length of the ignition electrode, and the proximal length is greater than or equal to half of the overall length of the ignition electrode.

6. The device for producing a plasma according to claim 5, wherein the proximal transverse dimension is constant over at least 90% of the proximal length, and the distal transverse dimension is constant over at least 90% of the distal length.

7. The device for producing a plasma according to claim 6, wherein the moving unit is configured so that in the first position, the ignition electrode is outside the dielectric tube.

8. The device for producing a plasma according to claim 1, wherein the ignition electrode has a conformation such as the proximal body portion has a proximal transverse dimension lower than a distal transverse dimension of the distal body portion.

9. The device for producing a plasma according to claim 8, wherein the proximal body portion has a proximal length along the axis of extension and the distal body portion has a distal length along the axis of extension, and wherein the proximal length is greater than or equal to the distal length.

10. The device for producing a plasma according to claim 9, wherein the distal length is greater than or equal to a quarter of the overall length of the ignition electrode, and the proximal length is greater than or equal to half of the overall length of the ignition electrode.

11. The device for producing a plasma according to claim 9, wherein the proximal transverse dimension is constant over at least 90% of the proximal length, and the distal transverse dimension is constant over at least 90% of the distal length.

12. The device for producing a plasma according to claim 1, wherein the moving unit is configured so that in the first position, the ignition electrode is outside the dielectric tube.

13. The device for producing a plasma according to claim 1, wherein the securing unit has a cylindrical shape along the axis of extension and has a given diameter.

14. The device for producing a plasma according to claim 13, wherein a diameter of the securing unit is substantially equal to a distal diameter of the distal body portion of the ignition electrode.

15. The device for producing a plasma according to claim 1, wherein the securing unit has a length, along the axis of extension, substantially equal to or greater than 1.3 D and preferably substantially equal to or greater than 1.5 D, D being an outer diameter of the dielectric tube.

16. The device for producing a plasma according to claim 1, wherein at least one part of the proximal body portion of the ignition electrode is located substantially at a central axis of the waveguide when the ignition electrode is in the second position.

17. The device for producing a plasma according to claim 1, wherein the waveguide is coupled to a reflector plane configured to generate a standing wave from the excitation wave.

18. The device for producing a plasma according to claim 17, wherein the reflector plane is movable.

19. The device for producing a plasma according to claim 17, wherein the reflector plane is located at a distance substantially equal to $n\lambda e/2+k\lambda e/2$ from at least one part of the ignition electrode when the ignition electrode is in the second position, $\lambda e$ being the wavelength of the excitation wave guided in the waveguide, n being a natural integer and k being a coefficient comprised between 0.7 and 1.3.

20. The device for producing a plasma according to claim 1, wherein the ignition electrode has a given electrical length such as the proximal body portion of the ignition electrode extends over an electrical length at least equal to an electrical length of the distal body portion of the ignition electrode.

* * * * *